July 12, 1966 R. L. SCHMAL 3,260,965
VARIABLE IMPEDANCE NETWORK EMPLOYING A JUNCTION TRANSISTOR
Filed Aug. 7, 1962
FIG. 2
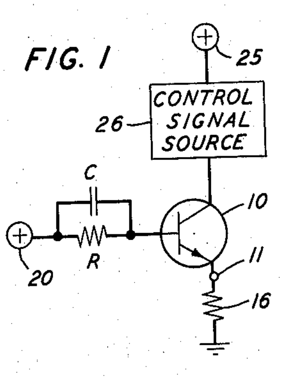
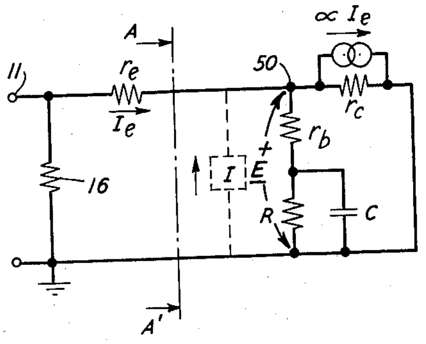
FIG. 3
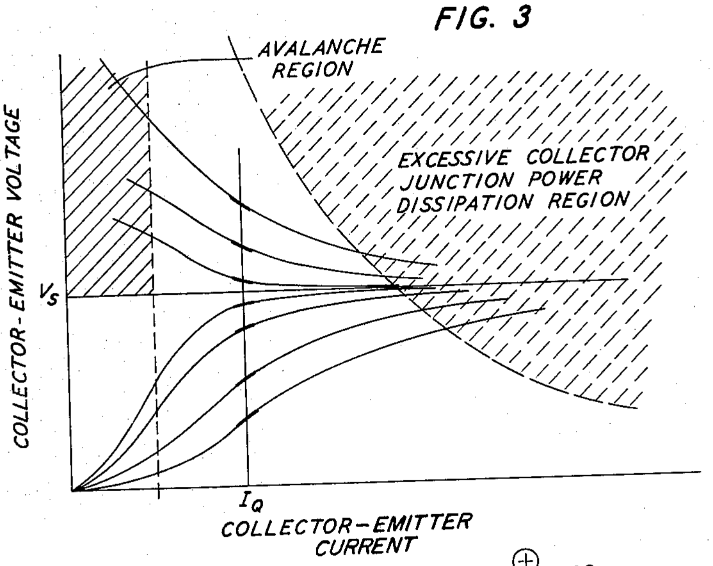
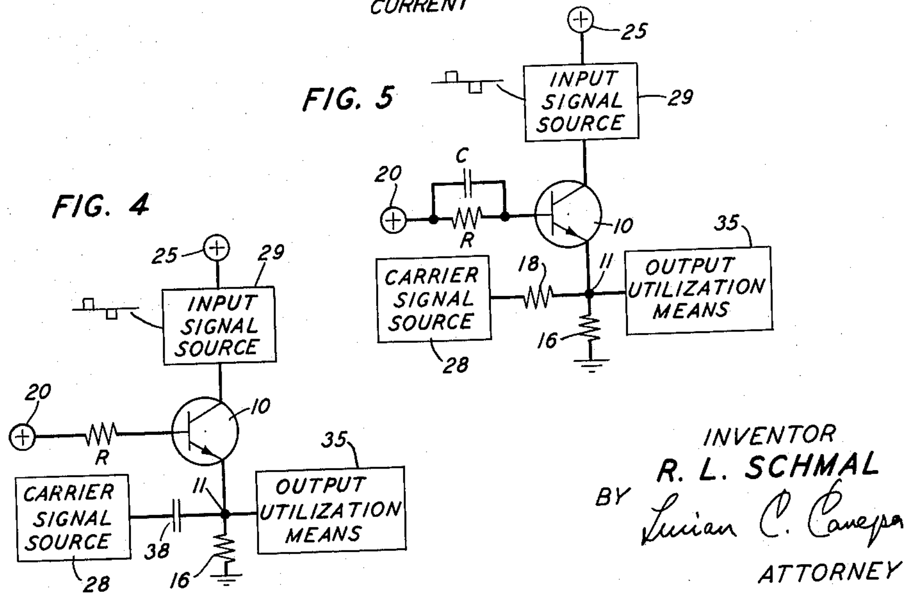
INVENTOR
R. L. SCHMAL
BY Lucian C. Canepa
ATTORNEY

United States Patent Office 3,260,965

Patented July 12, 1966

3,260,965

VARIABLE IMPEDANCE NETWORK EMPLOYING A JUNCTION TRANSISTOR

Richard L. Schmal, Edison, N.J., assignor to Bell Telephone Laboratories, Incorporated, New York, N.Y., a corporation of New York Filed Aug. 7, 1962, Ser. No. 215,393

15 Claims. (Cl. 332—30)

This invention relates to an electronically-controlled impedance and, more specifically, to an impedance wherein the real and imaginary components each take on both positive and negative values.

Various techniques have been employed to present an effective negative impedance to an alternating-current signal. For example, a class of devices including tunnel diodes and tetrodes, each having a voltage-current characteristic which includes a negative sloping portion, may accomplish this function. These devices give rise to a negative alternating-current impedance when quiescently biased to this portion of the characteristic.

Another well known technique for generating a negative impedance is to employ either current or voltage feedback. The various negative impedance converters of J. L. Merrill, Jr., described, for example, in United States Patents 2,582,498, issued January 15, 1952; 2,742,616, issued April 17, 1956; and 2,878,325, issued March 17, 1959, illustrate representative circuit arrangements.

The several negative impedance arrangements have found wide employment in the electronics and electrical control art. For example, the negative impedance converters have been extensively utilized as gain-producing repeaters in telephone and transmission applications. In addition, negative impedance circuits have been utilized with tuned circuits to produce oscillators. However, prior art arrangements have all operated in either a positive or negative impedance mode exclusively.

It is, therefore, an object of the present invention to provide a variable impedance arrangement.

More specifically, it is an object of the present invention to provide an electronically-controlled circuit which exhibits a complex impedance with its real and imaginary components being continuously variable.

It is another object of the present invention to provide an electronically-controlled circuit which exhibits a complex input impedance having real and imaginary components which take on both positive and negative values.

A further object of the present invention is to provide an electronically-variable impedance arrangement which is highly reliable and may be relatively simply and inexpensively constructed.

These and other objects of the present invention are realized in a specific, illustrative, variable impedance network employing a junction transistor which is biased such that its collector-emitter voltage approximates the transistor sustaining voltage which, as is well known, is the potential at which the transistor collector-emitter current gain is unity, and where the base current is zero. The transistor is also biased with a quiescent collector current which is of a sufficient magnitude to exceed the avalanche region. A resistor and capacitor are connected between the transistor base terminal and alternating-current ground, and a control voltage source is connected in series with the collector terminal. This arrangement presents an impedance between the transistor emitter and ground which has a positive or negative real component and a negative or positive imaginary component when the control signal is respectively negative or positive.

This result may be qualitatively explained by referring to the well known family of voltage-current characteristics for a junction transistor. The characteristics exhibit a varying slope at their intersections with the line representative of the biasing current described above. For voltages greater than the sustaining voltage, the characteristics have negative slopes which increase in absolute value with an increasing collector-to-emitter potential. Similarly, below the sustaining voltage, the characteristics have positive slopes which increase in magnitude with a decrease in collector-to-emitter potential, while a zero slope exists at the sustaining voltage. Hence, a positive control voltage adds to the quiescent bias voltage and gives rise to a negative sloping characteristic and a negative resistance, while a negative control voltage subtracts from the quiescent voltage thereby resulting in a positive resistance. The reactive component of the impedance stems from the employment of the aforementioned capacitor and results from the inherent regeneration of a junction transistor, and will be quantitatively described hereinafter.

Illustratively, the herein-described variable impedance circuit is employed in a phase modulating arrangement as the shunt output element in a voltage divider network to shift the phase and hence modulate a carrier signal which is applied to the input of the divider network.

It is thus a feature of the present invention that a variable impedance network include a junction transistor biased to the sustaining voltage thereof with a collector-emitter current which exceeds the avalanche region and corresponds to less than the maximum allowable collector junction power dissipation.

It is another feature of the present invention that a variable impedance network include a junction transistor biased to the sustaining voltage, and further include a resistor and a capacitor in parallel therewith connected between the transistor base terminal and the effective alternating-current collector terminal.

It is still another feature of the present invention that a variable impedance circuit include a junction transistor biased to its sustaining voltage, and also include a phase shifting capacitor which is connected to the transistor emitter terminal.

It is yet another feature of the present invention that a phase modulator include a variable impedance circuit comprising a junction transistor biased to its sustaining voltage with a collector-emitter current which exceeds the avalanche region, a source of carrier signals, and a capacitor connecting the carrier source with the transistor emitter terminal.

A complete understanding of the present invention and of the above and other features, variations and advantages thereof may be gained from a consideration of the following detailed description of three illustrative embodiments thereof presented hereinbelow in connection with the accompanying drawing, in which:

FIG. 1 is a schematic diagram of an illustrative variable impedance network which embodies the principles of the present invention;

FIG. 2 is an equivalent circuit for the circuit diagram illustrated in FIG. 1 and illustrates the broad concepts of the present invention;

FIG. 3 is a family of voltage current collector characteristics for the junction transistor illustrated in FIG. 1;

FIG. 4 is a schematic diagram of a first specific illustrative phase-modulating circuit which embodies the principles of the present invention; and FIG. 5 is a schematic diagram of a second specific illustrative phase-modulating circuit which embodies the principles of the present invention.

Referring now to FIG. 1, there is shown a schematic diagram of a basic, illustrative variable impedance network which includes a junction transistor 10 with its collector terminal connected to a source of positive potential 25 by a control signal voltage source 26. The base of the transistor 10 is connected to a second source of positive potential 20 by a resistor R and a capacitor C in shunt therewith, and the transistor emitter terminal 11 is grounded through a biasing resistor 16. The sources 20 and 25 are arranged to bias the transistor 10 with a collector-emitter voltage which approximates the transistor sustaining voltage $V_s$, illustrated in the transistor voltage-current characteristic shown in FIG. 3. The transistor 10 is also biased with a quiescent collector-emitter current $I_Q$ which exceeds the avalanche region shown in FIG. 3, and the current $I_Q$ is selected such that its product with the sustaining voltage $V_s$ is less than the maximum allowable collector power dissipation of the transistor 10. The proper biasing current is established by means of the biasing resistor 16, as the transistor collector-emitter current $I_Q$ is essentially the quotient of the magnitude of the source 20 divided by the resistance 16.

FIG. 2 is a schematic diagram depicting the equivalent circuit for the circuit arrangement of FIG. 1 with the potential sources replaced by their internal alternating-current impedances. Resistors $r_e$, $r_b$, and $r_c$ represent the internal emitter, base and collector junction impedances of the transistor 10, and $\alpha$ is the well known ratio of the collector current to emitter current. The resistors 16 and R, and the capacitor C are, of course, the same quantities connected in a like manner as shown in FIG. 1. The resistor $r_c$ is typically of the order of magnitude of one-half a megohm or larger, and hence will be neglected in any further discussion. Similarly, the biasing resistor 16 is of a larger order of magnitude than the other impedances in the circuit arrangement and it will henceforth be neglected. In addition, the internal base resistance $r_b$ is very small, typically 10 or 20 ohms, and it will also be deleted from any further consideration. To simplify the calculation of the impedance Z between the emitter terminal 11 and ground, the impedance $Z_{AA'}$ to the right of the section AA′ shown in FIG. 2 will first be determined. The resulting desired impedance Z will then be the sum of the resistor $r_e$ and the impedance $Z_{AA'}$.

To determine the impedance $Z_{AA'}$ to the right of the section AA′, assume the presence of an imaginary current generator of magnitude I, shown dotted in FIG. 2, causing current to flow out of the ground terminal and into a circuit terminal 50 at the junction of the resistors $r_e$, $r_b$, and $r_c$. Writing Kirchhoff's current equation for the conservation of current flowing into the node 50, and symbolizing the resulting voltage between the node 50 and ground by E, we have $$I-\frac{E}{R}-\frac{E}{\frac{1}{j\omega C}}-\alpha I=0 \quad (1)$$

Combining terms, transposing and factoring the current I and the voltage E;

$$I(1-\alpha)=E\left(\frac{1}{R}+j\omega C\right)=E\left(\frac{1+j\omega RC}{R}\right) \quad (2)$$

Cross multiplying and rationalizing the improper denominator;

$$\frac{E}{I}=(1-\alpha)\left(\frac{R}{1+j\omega RC}\right)\left(\frac{1-j\omega RC}{1-j\omega RC}\right)=(1-\alpha)\left(\frac{R-j\omega R^2C}{1+j\omega^2R^2C^2}\right) \quad (3)$$

The ratio of the determined node voltage E to the assumed current I, is, of course, the impedance $Z_{AA'}$ of the section AA′. Now if:

$$\omega^2R^2C^2<1 \quad (4)$$

which is to say $$\omega<\frac{1}{RC} \quad (5)$$

then $$Z_{AA'}=(1-\alpha)R-j(1-\alpha)\omega R^2C \quad (6)$$

Hence, the total impedance Z presented by the circuit shown in FIG. 1 between the transistor emitter terminal 11 and ground is;

$$Z=r_e+Z_{AA'}=r_e+(1-\alpha)R-j(1-\alpha)\omega R^2C \quad (7)$$

Thus, if $\alpha$ is less than 1, which is the normal operating node for a junction transistor, the impedance Z will take the form of a positive resistance in series with a capacitive reactance.

As is well known, $\alpha$ increases monotonically with an increasing collector-emitter potential and is less than 1 in the region below the transistor sustaining voltage $V_s$ (FIG. 3). The transistor operates in this region when the source 26 supplies a negative potential which subtracts from the sustaining voltage bias. Similarly, a positive potential supplied by the control signal source 26 adds to the biasing voltage and, as a result, the transistor operates in the region above the sustaining voltage, where $\alpha$ is greater than 1. In this $\alpha$ greater than 1 region, the impedance Z takes the form:

$$Z=-(\alpha-1)R+r_e+j(\alpha-1)\omega R^2C \quad (8)$$

which is the form of a negative resistance, as $r_e$ is small compared to $(\alpha-1)R$, in series with an inductive reactance. Hence, it is apparent that the impedance vectors symbolizing the impedances represented by Equations 7 and 8 are 180° out of phase for any given equal positive and negative value of $(1-\alpha)$.

It is noted that the capacitor C is employed solely to generate the reactive component of the impedance between the emitter terminal 11 of the transistor 10 in FIG. 1 and ground. If the capacitor C is deleted, and a zero value for C substituted in the impedance Equations 6 and 7, the input impedance, for $\alpha$ greater than 1, takes the form $$Z=R_{in}=-(\alpha-1)R+r_e \quad (9)$$

and, for $\alpha$ less than 1, the impedance takes the form $$Z=R_{in}=r_e+(1-\alpha)R \quad (10)$$

The impedance in the absence of the capacitor C is thus simply a resistance $R_{in}$ which may take on both positive and negative values when $\alpha$ is respectively less than, or greater than unity.

It should be noted at this point that the junction transistor circuit shown in FIG. 1 illustrates only one embodiment of applicant's basic invention, and the invention is shown most generally in the equivalent circuit illustrated in FIG. 2.

When a resistor, capacitor, and a dependent current generator are interconnected in a manner similar to the elements R, C and $\alpha$I illustrated in FIG. 2, the above-derived variable input impedance Z directly results. These circuit elements, and the dependent current generator in particular, may be manifested by a variety of circuit components well known in the art, many of which do not include a junction transistor. Hence, it should be observed that a variable impedance of the type described by Equations 7 through 10 directly follows from the FIG. 2 circuit, and the junction transistor arrangement of FIG. 1 represents only one of the plurality of combinations of circuit components which satisfy the requirements of the basic conceptual organization.

An illustrative utilization in a phase-modulating arrangement for the variable impedance network shown in FIG. 1 with the capacitor C deleted is shown in FIG. 4. The circuit includes the basic FIG. 1 arrangement except for the capacitor C, and also includes a sinusoidal carrier signal source 28 connected to the transistor emitter terminal 11 by a capacitor 38. In addition, an output utilization means 35 possessing a relatively high input impedance is coupled to the transistor emitter terminal 11. Further, the control signal source 26 of the FIG. 1 arrangement is replaced by an input signal source 29 which supplies the intelligence-bearing signal which is to phase modulate the carrier. The signals supplied by the source 29 will be assumed to be digital in nature, with positive and negative pulses representing the two binary characters. It is noted that a digital signal is employed solely to simplify the following circuit description, and an analog input might well be used instead. Letting $C_{38}$, $R_{in}$, $E_c$ and $E_o$ represent the capacity of the capacitor 38, the input resistance of the transistor as given by Equations 9 and 10, the carrier voltage supplied by the source 28 and the output voltage supplied to the output means 35, respectively, we have:

$$E_o=E_c\left(\frac{R_{in.}}{R_{in.}+\frac{1}{j\omega C}}\right)=E_c\left(\frac{j\omega R_{in.}C}{1+j\omega R_{in.}C}\right) \qquad (11)$$

Assuming $$\omega R_{in}C<<1$$

or in the usual form $$\omega\ll\frac{1}{R_{in}C},$$

then $$E_o=E(j\omega CR_{in}) \qquad (12)$$

Assume now that the input signal source 29 supplies a positive potential. The transistor 10 hence operates above the sustaining voltage, resulting in a real negative impedance Z between the emitter 11 of the transistor 10 and ground, as described by Equation 9. The output voltage, given by Equation 12, thus has a phase angle of $(-j)$, and hence the carrier signal is retarded by 90°. When the source 29 supplies a negative signal, the emitter-ground impedance is real and positive, as seen in Equation 10. The output potential $E_o$ thus has a phase angle of $(+j)$ and the carrier voltage is advanced by 90°. The output utilization means 35 is, of course, made responsive to the difference in phase created by the different input conditions.

A second phase-modulating embodiment is shown in FIG. 5 and is similar to the FIG. 4 embodiment with the addition of the capacitor C connected to the base of the transistor 10 in parallel with the resistor R, as employed in FIG. 1, and with the replacement of the capacitor 38 by a resistor 18. In this embodiment an input signal from the source 29 creates both a resistance and a reactive impedance component between the emitter 11 of the transistor 10 and ground, as shown in Equations 7 and 8. It may easily be shown, subject to the qualification that the resistance of the element 18 be large compared to the input impedance of the transistor 10, that the phase of the signal supplied to the output utilization means 35 differs by 180° depending upon the polarity of the modulating signal. Again, the output means 35 is made responsive to the difference in phase.

Summarizing the basic concepts of an illustrative embodiment of the present invention, a variable impedance arrangement made in accordance therewith includes a junction transistor which is biased such that the collector-emitter voltage approximates the transistor sustaining voltage, and the collector current is of sufficient magnitude to exceed the avalanche region. A resistor and capacitor are connected between the transistor base terminal and alternating-current ground, and a control voltage source is connected in series with the collector terminal. This arrangement presents an impedance between the transistor emitter and ground which has a positive or negative real component and a negative or positive imaginary component, when the control signal is respectively negative or positive.

The above-described variable impedance circuit may advantageously be employed in a variable phase shift filter network to phase modulate a carrier signal in response to perturbations of a control voltage source.

It is to be understood that the above-described arrangements are only illustrative of the application of the present invention. Numerous other arrangements may be devised by those skilled in the art without departing from the spirit and scope of the present invention. For example, in FIG. 1 a parallel tuned circuit may be connected between the emitter terminal of the transistor 10 and ground, and the capacitor C deleted to form an oscillating arrangement. Alternatively, a capacitor may be connected between the emitter of the transistor 10 and ground of the FIG. 1 arrangement, with the capacitor C remaining, to create an oscillator.

What is claimed is:

1. In combination in a variable impedance circuit, a transistor including base, emitter and collector terminals, a common ground terminal, means connected to said transistor collector and emitter terminals and said ground terminal for biasing said transistor to its sustaining voltage and to a collector-emitter current which exceeds the avalanche current region, said biasing means including a relatively high and a relatively low impedance connection between said ground terminal and said transistor emitter and collector terminals, respectively, a control voltage source connected to said collector terminal, and means including a capacitor and a resistor in parallel therewith connecting said transistor base terminal and said ground terminal.

2. In combination, a junction transistor including base, emitter and collector terminals, means for biasing said transistor to its sustaining voltage and to a collector-emitter current which exceeds the avalanche current region, a first resistor including first and second terminals, said first resistor terminal connected to said transistor base terminal, and means having a relatively small alternating-current impedance connecting said second resistor terminal and said transistor collector terminal.

3. A combination as in claim 2 further including a capacitor having first and second terminals, and means connecting said first capacitor terminal to said transistor base terminal and said second capacitor terminal to said second resistor terminal.

4. A combination as in claim 3 further including a control signal source connected to said transistor collector terminal.

5. A combination as in claim 4 further including a second resistor having first and second terminals, said first terminal of said second resistor connected to said transistor emitter terminal, and signal input means connected to said second terminal of said second resistor.

6. A combination as in claim 5 further including output utilization means connected to said transistor emitter terminal.

7. A combination as in claim 6 wherein said signal input means is a source of carrier signals.

8. In combination in a variable impedance network, a junction transistor including base, emitter and collector terminals, first and second biasing sources, a control signal source serially connecting said first biasing source and said transistor collector terminal, a first resistor serially connecting said transistor base terminal and said second biasing source, a ground terminal, and a biasing resistor connecting said transistor emitter terminal and said ground terminal, said first and second sources and said biasing resistor biasing said transistor to its sustaining voltage and to a collector-emitter current which exceeds the avalanche current region.

9. A combination as in claim 8 further including a capacitor connected in parallel with said first resistor.

10. A combination as in claim 9 further including a carrier signal source, a second resistor connecting said carrier signal source and said transistor emitter terminal, and an output utilization means connected in parallel with said biasing resistor.

11. In combination in a phase modulator, a junction transistor including base, emitter and collector terminals, an input signal source connected to said transistor collector terminal, means for biasing said transistor to its sustaining voltage and to a collector-emitter current which exceeds the avalanche current region, a resistor, a capacitor connected in parallel with said resistor forming first and second junctions, means connecting said first junction to said transistor base terminal, means having a relatively low alternating-current impedance connecting said second junction to said transistor collector terminal, a carrier signal source, and a resistor connecting said carrier signal source and said transistor emitter terminal.

12. A combination as in claim 11 further including an output utilization means connected to said transistor emitter terminal.

13. In combination in a phase-modulating arrangement, a junction transistor including base, emitter and collector terminals, means for biasing said transistor to its sustaining voltage and to a collector-emitter current which exceeds the avalanche current region, input signal source means connected in series with said transistor collector terminal, a resistor having first and second terminals, means connecting said first terminal to said transistor base terminal, means having a relatively low alternating-current impedance connecting said second terminal and said transistor collector terminal, a carrier signal source, and a capacitor connecting said carrier signal source to said transistor emitter terminal.

14. A combination as in claim 13 further including output utilization means connected to said transistor emitter terminal.

15. In combination, a junction transistor including base, emitter and collector terminals, means for biasing said transistor to its sustaining voltage and to a collector-emitter current which exceeds the avalanche current region, first impedance means connected between said transistor collector and emitter terminals, a control signal source connected to said transistor collector terminal, output utilization means connected to said transistor emitter terminal, a carrier signal source, and second impedance means connected between said carrier source and said transistor emitter terminal.

References Cited by the Examiner

UNITED STATES PATENTS 3,003,122 10/1961 Gerhard -------------- 332—9

FOREIGN PATENTS 814,185 6/1959 Great Britain.

OTHER REFERENCES

IBM Technical Bulletin, September 1960, vol. 3, No. 4, page 41.

Motorola Semiconductor Prod., Inc., August 1960, "Voltage Breakdown in Mesa Transistors," 4 sheets.

ROY LAKE, *Primary Examiner.*

A. L. BRODY, *Assistant Examiner.*